United States Patent [19]

Yazawa

[11] Patent Number: 4,939,046
[45] Date of Patent: Jul. 3, 1990

[54] MAGNETIC RECORDING MEDIUM
[75] Inventor: Kenji Yazawa, Miyagi, Japan
[73] Assignee: Sony Corporation, Tokyo, Japan
[21] Appl. No.: 167,085
[22] Filed: Mar. 11, 1988

[30] Foreign Application Priority Data

Mar. 25, 1987 [JP]  Japan .................................. 62-70967

[51] Int. Cl.$^5$ ............................................. G11B 23/00
[52] U.S. Cl. ................................. 428/694; 204/192.2;
  428/611; 428/678; 428/900; 428/928
[58] Field of Search ............... 428/694, 900, 611, 641,
  428/678, 928; 427/132, 131; 204/192.2

[56] References Cited

U.S. PATENT DOCUMENTS

| | | | |
|---|---|---|---|
| 4,420,531 | 12/1983 | Tokuda | 428/329 |
| 4,423,452 | 12/1983 | Kajimoto et al. | 360/131 |
| 4,539,264 | 9/1985 | Yazawa et al. | 428/900 |
| 4,539,265 | 9/1985 | Yazawa et al. | 428/900 |
| 4,543,301 | 9/1985 | Yazawa et al. | 428/694 |
| 4,567,116 | 1/1986 | Sawada et al. | 428/694 |
| 4,595,631 | 6/1986 | Matsumoto | 428/323 |
| 4,632,870 | 12/1986 | Takamatsu et al. | 428/329 |
| 4,707,756 | 11/1987 | Futamoto et al. | 428/900 |

FOREIGN PATENT DOCUMENTS 2153393  8/1985  United Kingdom .
2153851  8/1985  United Kingdom .

Primary Examiner—Paul J. Thibodeau
Attorney, Agent, or Firm—Hill, VanSanten, Steadman & Simpson

[57] ABSTRACT

A magnetic recording medium employing the ferromagnetic film as the magnetic layer is disclosed in which the non-magnetic metal and/or the non-magnetic metal oxide are diffused into the ferromagnetic film along the direction of film thickness so that the concentration distribution will become substantially uniform. The magnetic recording medium has a high rectangular ratio and a low dispersion of the coercive force.

3 Claims, 2 Drawing Sheets ated by the Auger analysis.
MAGNETIC RECORDING MEDIUM

BACKGROUND OF THE INVENTION

1. Field of the Invention

This invention relates to a magnetic recording medium in which a ferromagnetic film comprising essentially of Co, Ni, Fe, or an alloy thereof is used as a magnetic layer.

2. Statement of the Related Art

In the field of the magnetic recording, it is incumbent to improve the recording density, such that it is contemplated to employ the magnetic recording medium employing the ferromagnetic film as the magnetic layer (hereafter referred to as the thin film type magnetic recording medium), instead of the conventional coating type magnetic recording medium.

The thin film type magnetic recording medium is formed by processing the ferromagnetic metal material, such as Co-Ni, on the substrate into a thin film by physical vapour deposition such as the vacuum evaporation method to form a magnetic layer. Since the high molecular binder is not used as in the case of the coating type magnetic recording medium, high residual magnetic flux density is obtained, while the high output and superior response to short wavelength characteristics can be obtained since an extremely thin film thickness of the ferromagnetic film may be obtained.

It is noted that, in the above described thin film type magnetic recording medium, it is difficult to procure coercive force by simply evaporating the ferromagnetic metal material, such as Co-Ni, on the non-magnetic substrate, so that it is customary to form the ferro-magnetic film by oblique evaporation, however, the lower evaporation efficiency is not desirable in this case in regard to productivity.

In the case of the disk-shaped magnetic recording medium extensively used as the recording medium for computers, problems are presented in orientation characteristics obtained by the aforementioned oblique evaporation. These orientation characteristics are acceptable to some extent with an elongated magnetic recording medium such as the magnetic tape, however, such orientation characteristics in the disk-shaped ferromagnetic recording medium result in increased modulation in the envelope waveform of the playback output.

The present Applicant has proposed a magnetic recording medium in the Japanese Laid-Open Patent Publication No. 204831/1986 wherein a low melting metal (non-magnetic metal) is deposited previously as a film and the ferromagnetic metal material is deposited as a film from a substantially perpendicular direction by vacuum evaporation. This magnetic recording medium exhibits superior characteristics in evaporation efficiency and orientation characteristics as well as the required coercive force.

Needless to say, higher rectangular characteristics of the hysteresis loop is required of the magnetic recording medium employed in the field of the digital magnetic recording technology employed in, for example, data recording. This means that the distribution of the coercive force is uniform. It can be easily be premeditated that the majority of endeavors for evolving the magnetic recording medium has been expended in improving these characteristics.

In this light, the aforementioned magnetic recording medium has much to be desired and a further improvement is desirable.

OBJECT AND SUMMARY OF THE INVENTION

In view of the foregoing, it is an object of the present invention to provide a magnetic recording medium having excellent coercive force distribution and superior rectangular characteristics of hysteresis loop.

As a result of our prolonged eager researches into developing a magnetic recording medium having superior coercive force distribution, the present inventors have found that the state of distribution of the non-magnetic metals in the ferromagnetic film is critical. The present invention has been completed on the basis of this finding and is characterized in that the non-magnetic metal and/or the non-magnetic metal oxide are distributed into the ferromagnetic film formed on the substrate so that the distribution of the concentration will be substantially uniform along the film thickness.

In accordance with the present invention, the non-magnetic metal is diffused into the ferromagnetic film so that it exhibits substantially uniform concentration distribution in the film thickness direction, so that the coercive force distribution of the film is reduced and a magnetic recording medium can be provided which is excellent in electro-magnetic conversion characteristics and magnetic properties, above all, the rectangular ratio.

DETAILED DESCRIPTION OF THE INVENTION

Figure 1:
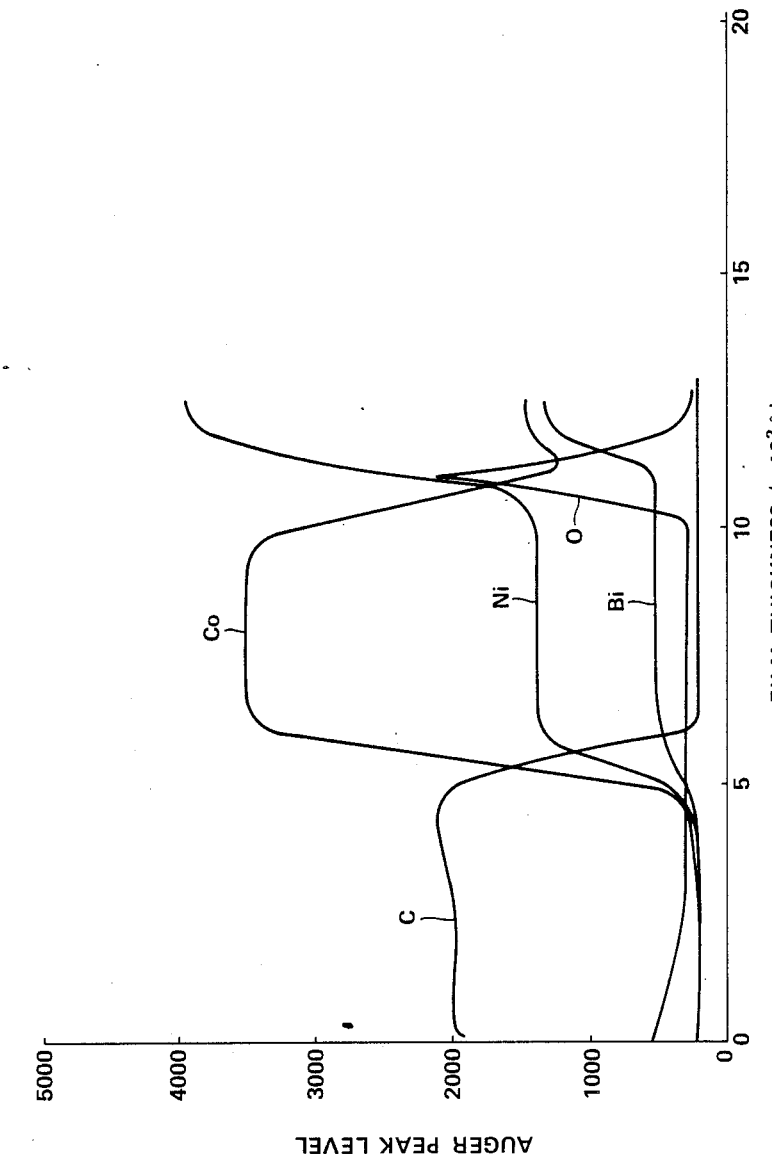
FIG. 1 is a characteristic diagram showing the concentration distribution along the film thickness of the ferromagnetic film of the Example, as measured by the Auger analysis.

As the ferromagnetic metal material that constitutes the ferromagnetic film of the magnetic layer, in the magnetic recording medium of the present invention, any material customarily employed in this type of the medium may be employed, including metals such as Fe, Co or Ni, Co-Ni alloys, Fe-Co alloys, Fe-Co-Ni alloys, Fe-Co-B alloys or Co-Ni-Fe-B alloys, occasionally admixed with metal elements, such as Cr, Al, Pt, Ta, W or V.

The non-magnetic metals diffused into the aforementioned ferromagnetic film may include Bi, Sb, Pb, Sn, Ga, In, Cd, Ge, Si and Tl.

Into the aforementioned ferromagnetic film, there are diffused the aforementioned non-magnetic metals and/or oxides of these non-magnetic metals, with the distribution of the concentration thereof being uniform along the film thickness. Although the distribution of the concentration is said to be uniform, these non-magnetic metals do not exist as a solid solution in the ferromagnetic film, but the non-magnetic metal exists unevenly in the grain boundry of, for example, Co-Ni crystal grains such that the distribution of the concentration as a whole is substantially uniform along the film thickness. The size of the crystal grains (so-called grain size) of the ferromagnetic metal material constituting the ferromagnetic film is preferably in the range of several tens to 200 Å. With too large a grain size, the crystal grain may turn out to be the grain with multiple magnetic domains resulting in increased magnetic interaction and reduced coercive force.

In order to provide the aforementioned film structure, the ground layer of the non-magnetic metal is previously formed and a ferromagnetic film may be deposited by sputtering on this ground layer. The film thickness of the ferromagnetic film may be practically 100 to 3000 Å or thereabouts and preferably in the range of 400 to 1000 Å.

During sputtering of the ferromagnetic film, an optimum coercive force distribution may be obtained by adjusting the sputtering conditions, while electro-magnetic conversion characteristics are also more excellent than those obtained by evaporation.

For example, the substrate temperature during the sputtering is preferably not lower than 150° C. With the temperature not higher than 150° C., prescribed diffusion does not occur, while the magnetic characteristics of the produced ferromagnetic film are deteriorated. Above all, it is difficult to procure a coercive force.

The power to make the film, i.e., the making power is preferably not lower than $1000$ $W/62.5$ $cm^2$. With the making power not lower than $1000$ $W/62.5$ $cm^2$, the aforementioned film structure is formed. Conversely, with the making power less than $1000$ $W/62.5$ $cm^2$, the sputtered particles have reduced energy so that a sufficient diffusion does not take place but the concentration of the non magnetic metal becomes higher at the substrate side so that it again becomes difficult to procure prescribed magnetic characteristics.

The sputtering pressure (Ar gas pressure) is only sufficient if it allows normal sputtering to occur and is usually set so as to be not higher than $1 \times 10^{-2}$ Pa. The value of the sputtering pressure differs slightly with the sputtering system employed. For example, the pressure is set so as to be equal to about $10^{-2}$ to $10^{-1}$ Pa and $10^{-1}$ to 1 Pa for RF sputtering and DC sputtering, respectively.

The ground layer of the non-magnetic metal of 40 to 100 Å or thereabouts, depending on the method employed, such as sputtering or vacuum evaporation, but it is preferably formed by sputtering.

When the vacuum of the apparatus is broken after deposition of the non-magnetic metal, the surface of the non-magnetic metal layer is oxidized to suppress the preceding diffusion. It is therefore preferred that the degree of vacuum be maintained until the ferromagnetic film is deposited by sputtering.

In accordance with the above method, the non-magnetic metal is diffused into the ferromagnetic film and a film structure is provided in which the non-magnetic metal is unevenly present at the grain boundary of the Co-Ni crystal grains. In this case, it is preferred that the ground layer of the non-magnetic metal be completely diffused, however, the ground layer may also remain slightly. The state of inplane distribution of the non-magnetic metal is preferably substantially uniform, however such is not dispensable.

For forming the film structure, in addition to the aforementioned method of sputtering the ferromagnetic film on the non-magnetic metal film as the ground layer, a method may also be employed in which the non-magnetic metal and the ferromagnetic metal material are sputtered or evaporated simultaneously. However, in this case, the non-magnetic metal (such as Bi) and the ferromagnetic metal (such as Co-Ni) are simply mixed together so that magnetically it becomes difficult to procure the coercive force.

Although the present invention is applied to all kinds of the magnetic recording media, such as tape- or disk-shaped media, the effect becomes maximum when an application is made to a disk-shaped magnetic recording medium.

The non-magnetic substrate on which the ferromagnetic film having the film structure includes a resilient high polymeric substrate typified by polyethylene terephthalate, polyethylene naphthalate, aromatic polyamide resin or polyimide, and a rigid substrate such as silicon, glass or light metals, such as aluminum, inclusive of alloys thereof. Above all, when using rigid substrates to be used as a so-called hard disk, it is preferred that the substrate having minute projections and recesses on the surface thereof be employed. For example, when using a substrate formed with recesses about 0.1 microns or less in diameter and 0.03 micron in depth on the surface thereof such as chromate alumite substrate, the ferromagnetic film is comminuted magnetically by the minute surface structure resulting in a higher SN ratio.

It is noted that the magnetic recording medium of the present invention is mainly composed of the aforementioned substrate and the ferromagnetic film, but the well-known back-coat layer, base layer or the top coat layer, including lubricant or rust-proofing agent, may be occasionaly formed as the occasion may require. When the disk is to be the hard disk, the hard protective film may be formed, such as carbon protective film.

The overall operation is as follows. When the ferromagnetic film (such as Co-Ni film) is sputtered on the ground layer composed of non-magnetic metals (such as Bi), the substrate temperature is high, while the Bi film is mobile, so that the Bi atoms are diffused into the Co-Ni film. Because of the large size of the Bi atoms, diffusion occurs through the Co-Ni lattice but through the film defects, such as the structurally weakened portions, such as grain boundaries.

Therefore, Bi exists unevenly in the crystal grain boundaries of the Co-Ni film. Said simply, the Bi atoms being diffussed will be intruded into the structural defects of the Co-Ni film to communitize the Co-Ni film into fine crystal grains.

As a result, from the viewpoint of magnetism, the ferromagnetic Co-Ni grains are communitized by the nonmagnetic Bi, so that they exhibit a weaker magnetic interaction, thus acting as fine particles exibiting only weak interaction between the particles. Also, the Co-Ni crystal grains are comminutized down to the single magnetic domain, so that presumably the coercive force is increased.

On the contrary, when the ferromagnetic film and the non-magnetic metal are evaporated or sputtered simultaneously, the concentration distribution of Bi and Co-Ni is uniform since the time of film generation. Thus there is no factor of Bi diffusion, both the concentration and heat being the same, so that Bi is mixed simply with Co-Ni. The Co-Ni crystal grains are particles with multiple magnetic domains larger than the single magnetic domain particle, so that the coercive force is reduced.

The present invention will be explained with reference to specific examples thereof, it being to be noted that the present invention is not limited to these examples.

EXAMPLE

Employing a dough-nut shaped Ni-P plated aluminum substrate with an outside diameter of 95 mm and an inside diameter of 25 mm, and the conditions including the substrate heating temperature of 160° C. and an argon gas pressure of $4 \times 10^{-1}$ Pa, the Bi ground layer, the Co-Ni film and the carbon protective film were formed in this sequence by sputtering. The film thicknesses of the Bi ground layer, Co-Ni film and the carbon protective film were 55 Å, 550 Å and 350 Å, respectively. The film composition for the Co-Ni film was 65 atom % for Co and 35 atom % for Ni.

Comparative Example

Employing the substrate same as that used in the preceding Example, and the substrate heating temperature of 160° C. in a vacuum evaporator, the Bi ground layer, Co-Ni film and the carbon protective film having film thicknesses of 55 Å, 550 Å and 350 Å, respectively, were formed in this sequence.

Figure 2:
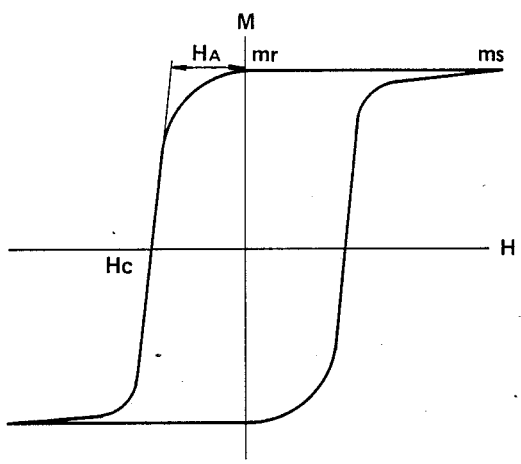
FIG. 2 is a characteristic diagram showing a magnetization curve for explaining the measured magnetic characteristics.

Static magnetic properties were then measured of the magnetic disks according to the Example and the Comparative Example. The static magnetic properties measured were the coercive force $H_c$, rectangular ratio $R_s$, coercive force rectangular ratio $S^*$, residual magnetization $m_r$ and saturation magnetization $m_s$. It is noted that the rectangular ratio $R_s$ and $S^*$ were found by the following equation on the basis of the values of $H_c$, $H_A$, $m_r$ and $m_s$ shown in FIG. 2.

$$R_S = \frac{m_r}{m_s} \times 100(\%) \quad (1)$$

$$S^* = \frac{H_A}{H_C} \times 100(\%) \quad (2)$$

The results are shown in Table 1.

TABLE 1

|  | $H_c$ (Oe) | $R_s$ (%) | $S^*$ (%) | resid. magn. (emu) | sat. magn. (emu) |
|---|---|---|---|---|---|
| Ex. | 680 | 86.6 | 93.4 | $3.71 \times 10^{-3}$ | $4.28 \times 10^{-3}$ |
| Comp. Ex. | 605 | 82.8 | 82.8 | $4.08 \times 10^{-3}$ | $4.68 \times 10^{-3}$ |

(In the Table, the values for residual and saturation magnetization are those per unit area)

Further, the electro-magnetic conversion characteristics were measured under the following conditions. The electromagnetic characteristics were measured at the outside diameter (OD: 90 $\phi$ position) and the inside diameter portion (ID: 56 $\phi$ position).

Test head : mini-composite type head
Track width Tw : 18 microns
Gap length : 1 micron
Head Float : 0.35 micron
Velocity 10 m/sec The recorded current at the outside diameter portion is 56 $mA_{p-p}$, while that at the inside diameter portion is 40 $mA_{p-p}$. As the measurement procedure, the signal at 1.25 MHz (1 F) was recorded to find the track averaged amplitude (TAA), then the signal of 2.5 MHz (2 F) was recorded, the track averaged amplitude TAA was found and RES was calculated in accordance with the following equation, $$RES = \frac{2F\ TAA}{1F\ TAA} \times 100(\%) \quad (3)$$

The results are shown in Table 2.

TABLE 2

|  | OD | | | ID | | |
|---|---|---|---|---|---|---|
|  | 1F TAA mVp-p | RES (%) | O/W (dB) | 2F TAA mVp-p | RES (%) | O/W (dB) |
| Ex. | 0.53 | 81 | −29 | 0.25 | 63 | −33 |
| Comp. Ex. | 0.58 | 76 | −32 | 0.20 | 50 | −32 |

From these Table 1 and 2, the difference between the static magnetic and electro-magnetic conversion characteristics of the two kinds of the magnetic disks was made apparent. Above all, in the Examples wherein the ferromagnetic film was deposited by the sputtering method, the electro-magnetic conversion characteristics (RES) were markedly improved.

In order to determine whether or not this difference is due to the difference in the film structure, an elemental analysis in the film thickness direction was conducted by the Auger analysis. It was thus revealed that the film structure including the deposited ferromagnetic film produced by sputtering exhibited substantially constant Co, Ni and Bi concentrations in the film thickness direction, as shown in FIG. 1. From this may be presumed that the film obtained by sputtering exhibits a more uniform composition along the film thickness direction so that the film exhibits similarly uniform magnetic characteristics.

Figure 3:
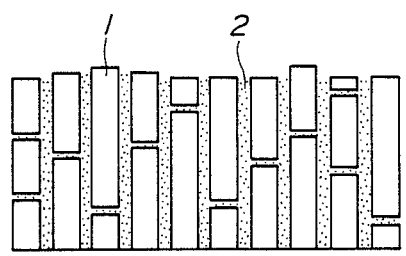
FIG. 3 is a schematic view showing the film structure of the ferromagnetic film of the Example.

Further, for clarifying the causes of the isotropic high coercive force of the ferromagnetic film, the film strucure analysis was made by observation through a transmission electron microscope. It was thus revealed that, as shown in FIG. 3, the film structure of the ferromagnetic film may be described as the non-magnetic amorphous Bi(2) (inclusive of oxides) being diffused into the space between the Co-Ni crystal grains (1).

We claim as our invention:

1. A magnetic recording medium comprising a nonmagnetic substrate and a magnetic layer formed on said substrate having anisotropy along a surface of said magnetic layer, said magnetic layer being formed of micro grains of ferromagnetic metal or alloy and nonmagnetic metal and nonmagnetic metal oxide distributed mainly around said micro grains of said first ferromagnetic metal or alloy, said nonmagnetic metal and nonmagnetic metal oxide having a uniform concentration distribution throughout the thickness of said magnetic layer.

2. A magnetic recording medium comprising a nonmagnetic substrate and a magnetic layer formed on said substrate having anisotropy along a surface of said magnetic layer, said magnetic layer being formed by sputtering magnetic Co or Co alloy under the condition that the temperature of said substrate is not less than 150° C. at a location on said substrate where nonmagnetic BI is previously deposited, resulting in a magnetic layer formed of micro grains of ferromagnetic Co or Co alloy and said nonmagnetic Bi or bismuth oxide distributed mainly around said micro grains of said ferromagnetic Co or Co alloy, said nonmagnetic Bi or bismuth oxide having an overall concentration distribution, throughout the thickness of said magnetic layer which is substantially uniform.

3. A magnetic recording medium according to claims 1 and 2, said micro grains of said ferromagnetic material or alloy having a grain size between 50 and 200 angstroms.

* * * * *